(12) United States Patent
Sakaguchi et al.

(10) Patent No.: US 9,796,424 B2
(45) Date of Patent: Oct. 24, 2017

(54) VEHICLE BODY FRAME AND VEHICLE UNDERFLOOR STRUCTURE

(71) Applicant: TOYOTA JIDOSHA KABUSHIKI KAISHA, Toyota-shi, Aichi (JP)

(72) Inventors: Naoya Sakaguchi, Okazaki (JP); Yutaka Yamada, Kariya (JP); Kenichiro Yoshimoto, Tokai (JP); Masahiro Ishikawa, Toyota (JP); Hiroharu Iizuka, Aichi-gun (JP); Keita Ito, Nisshin (JP); Kazumichi Kishida, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/025,620

(22) PCT Filed: Aug. 13, 2014

(86) PCT No.: PCT/JP2014/071694
§ 371 (c)(1),
(2) Date: Mar. 29, 2016

(87) PCT Pub. No.: WO2015/049926
PCT Pub. Date: Apr. 9, 2015

(65) Prior Publication Data
US 2016/0236713 A1  Aug. 18, 2016

(30) Foreign Application Priority Data

Oct. 4, 2013  (JP) .................................. 2013-209441

(51) Int. Cl.
*B62D 21/03* (2006.01)
*B60K 1/04* (2006.01)
(Continued)

(52) U.S. Cl.
CPC ............... *B62D 21/03* (2013.01); *B60K 1/04* (2013.01); *B62D 21/157* (2013.01);
(Continued)

(58) Field of Classification Search
CPC .. B62D 21/03; B62D 25/2036; B62D 21/157; B60K 1/04; B60K 2001/0438; B60Y 2306/01
(Continued)

(56) References Cited

U.S. PATENT DOCUMENTS 5,392,873 A * 2/1995 Masuyama ............. B60R 16/04
180/68.5
2010/0307848 A1* 12/2010 Hashimoto ............. B60K 1/04
180/68.5
(Continued)

FOREIGN PATENT DOCUMENTS

EP  2070754 A1  6/2009
EP  2620353 A1  7/2013
(Continued)

*Primary Examiner* — Jason S Morrow
*Assistant Examiner* — E Turner Hicks
(74) *Attorney, Agent, or Firm* — Oliff PLC (57) ABSTRACT

A vehicle body frame includes: side frames that have at least inner walls that are disposed at vehicle transverse direction inner sides and upper walls that are disposed at vehicle body vertical direction upper sides, and that are formed as closed cross-sectional structures, and that extend in a vehicle body longitudinal direction, and that are fastened and fixed to under members that are disposed at a vehicle body lower side of a floor panel; and an upper frame that is disposed further toward a vehicle transverse direction inner side than the inner walls and at a height that is lower than the upper walls, and at which an installed object is installed.

4 Claims, 11 Drawing Sheets

(51) Int. Cl.
*B62D 21/15* (2006.01)
*B62D 25/20* (2006.01)

(52) U.S. Cl.
CPC .. *B62D 25/2036* (2013.01); *B60K 2001/0438* (2013.01); *B60Y 2306/01* (2013.01)

(58) Field of Classification Search
USPC ....... 296/187.08, 187.12, 193.07, 203.03, 30
See application file for complete search history.

(56) References Cited

U.S. PATENT DOCUMENTS

2012/0121959 A1\* 5/2012 Yamada ................... B60K 1/04
429/100
2015/0176673 A1 6/2015 Kaneko et al.

FOREIGN PATENT DOCUMENTS

| JP | H07-117726 A | 5/1995 |
| JP | H07-242125 A | 9/1995 |
| JP | 2008-174181 A | 7/2008 |
| JP | 2010-284984 A | 12/2010 |
| JP | 2013-35410 | \* 8/2011 |
| JP | 2013-035410 A | 2/2013 |
| JP | 2014-227075 | \* 5/2013 |
| JP | 2013-123956 A | 6/2013 |
| JP | 2014-031109 A | 2/2014 |
| JP | 2014-227075 A | 12/2014 |
| WO | 2014/188247 A1 | 11/2014 |

\* cited by examiner

VEHICLE BODY FRAME AND VEHICLE UNDERFLOOR STRUCTURE

TECHNICAL FIELD

The present invention relates to a vehicle body frame at which an installed object, such as a battery for driving or the like, is installed, and to a vehicle underfloor structure that is provided with the vehicle body frame.

RELATED ART

Vehicle battery installation structures that make it difficult for a battery for driving, that is disposed at the lower side of the floor portion of an electric automobile or an electric hybrid automobile or the like, to be submerged are conventionally known (see, for example, Japanese Patent Application Laid-Open (JP-A) No. 2010-284984).

SUMMARY OF INVENTION

Technical Problem

However, in the above-described structures, because the interval between the floor portion and a battery pan at which the battery for driving is installed is narrow, there is the concern that the degrees of freedom in the setting space for installation of the battery for driving will decrease. In this way, there is room for improvement in structures that ensure the degrees of freedom in the setting space for installation of an installed object such as a battery for driving or the like.

Thus, the present invention provides a vehicle body frame that can ensure the degrees of freedom in the setting space for installation of an installed object, and a vehicle underfloor structure that is provided with the vehicle body frame.

Solution to Problem

A vehicle body frame in accordance with a first aspect of the present invention includes: side frames that have at least inner walls that are disposed at vehicle transverse direction inner sides and upper walls that are disposed at vehicle body vertical direction upper sides, and that are formed as closed cross-sectional structures, and that extend in a vehicle body longitudinal direction, and that are fastened and fixed to under members that are disposed at a vehicle body lower side of a floor panel; and an upper frame that is disposed further toward a vehicle transverse direction inner side than the inner walls and at a height that is lower than the upper walls, and at which an installed object is installed.

In accordance with the first aspect of the present invention, the upper frame, that is disposed further toward the vehicle transverse direction inner side than the inner walls of the side frames and at which an installed object is installed, is disposed at a height that is lower than the upper walls of the side frames. Accordingly, the interval between the upper frame and the floor panel is wide, and the degrees of freedom in the setting space for installation of an installed object are ensured.

Further, in accordance with a second aspect of the present invention, in the vehicle body frame in accordance with the first aspect of the present invention, a lower frame may be disposed at a lower side of the upper frame, and the upper frame, by being joined to the lower frame, may form a closed cross-sectional structure that extends in a vehicle transverse direction.

In accordance with the second aspect of the present invention, the upper frame, by being joined to the lower frame, forms a closed cross-sectional structure that extends in the vehicle transverse direction. Accordingly, at the time of a side collision of the vehicle, the collision load that is transmitted from the side frame to the upper frame is absorbed efficiently by the upper frame.

Further, in accordance with a third aspect of the present invention, the vehicle body frame in accordance with the first or second aspect of the present invention may have connecting members that obliquely connect the upper frame and upper portions of the inner walls, as seen from the vehicle body longitudinal direction.

In accordance with the third aspect of the present invention, the connecting member obliquely connects the upper frame and the upper portion of the inner wall, as seen from the vehicle body longitudinal direction. Accordingly, the collision load, that is inputted to the side frame at the time of a side collision of the vehicle, is efficiently transmitted by the connecting member to the upper frame.

A vehicle underfloor structure in accordance with a fourth aspect of the present invention includes: under members that extend in a vehicle body longitudinal direction and are disposed at a vehicle body lower side of a floor panel; and a vehicle body frame that has side frames that have at least inner walls that are disposed at vehicle transverse direction inner sides and upper walls that are disposed at vehicle body vertical direction upper sides, and that are formed as closed cross-sectional structures, and that extend in the vehicle body longitudinal direction, and that are fastened and fixed to the under members, and an upper frame that is disposed further toward a vehicle transverse direction inner side than the inner walls and at a height that is lower than the upper walls, and at which an installed object is installed.

In accordance with the fourth aspect of the present invention, the upper frame, that is disposed further toward the vehicle transverse direction inner side than the inner walls of the side frames and at which an installed object is installed, is disposed at a height that is lower than the upper walls of the side frames. Accordingly, the interval between the upper frame and the floor panel is wide, and the degrees of freedom in the setting space for installation of an installed object are ensured.

Further, in accordance with a fifth aspect of the present invention, in the vehicle underfloor structure in accordance with the fourth aspect of the present invention, a lower frame may be disposed at a lower side of the upper frame, and the upper frame, by being joined to the lower frame, may form a closed cross-sectional structure that extends in a vehicle transverse direction.

In accordance with the fifth aspect of the present invention, the upper frame, by being joined to the lower frame, forms a closed cross-sectional structure that extends in the vehicle transverse direction. Accordingly, at the time of a side collision of the vehicle, the collision load that is transmitted from the side frame to the upper frame is absorbed efficiently by the upper frame.

Further, in accordance with a sixth aspect of the present invention, the vehicle underfloor structure in accordance with the fourth or fifth aspect of the present invention may have connecting members that obliquely connect the upper frame and upper portions of the inner walls, as seen from the vehicle body longitudinal direction.

In accordance with the sixth aspect of the present invention, the connecting member obliquely connects the upper frame and the upper portion of the inner wall, as seen from the vehicle body longitudinal direction. Accordingly, the collision load, that is inputted to the side frame at the time of a side collision of the vehicle, is efficiently transmitted by the connecting member to the upper frame.

Further, in accordance with a seventh aspect of the present invention, in the vehicle underfloor structure of any of the fourth through sixth aspects of the present invention, energy absorbing members may be disposed at vehicle transverse direction outer sides of the side frames.

In accordance with the seventh aspect of the present invention, energy absorbing members are disposed at the vehicle transverse direction outer sides of the side frames. Accordingly, a portion of the collision load, that is inputted to the energy absorbing member at the time of a side collision of the vehicle, is absorbed by plastic deformation of the energy absorbing member. Accordingly, the collision load that is transmitted to the side frame is reduced, and damage to the vehicle body frame is suppressed.

In accordance with an eighth aspect of the present invention, in the vehicle underfloor structure of any of the fourth through seventh aspects of the present invention, overhang portions, that jut-out from the side frames toward vehicle transverse direction outer sides, may be fastened and fixed to the under members.

In accordance with the eighth aspect of the present invention, the overhang portions, that jut-out from the side frames toward the vehicle transverse direction outer sides, are fastened and fixed to the under members. Accordingly, a portion of the collision load, that is transmitted to the under member at the time of a side collision of the vehicle, is absorbed by plastic deformation of the overhang portion. Accordingly, the collision load that is transmitted to the side frame is reduced, and damage to the vehicle body frame is suppressed.

Advantageous Effects of Invention

As described above, in accordance with the first aspect of the present invention, the degrees of freedom in the setting space for installation of an installed object can be ensured.

In accordance with the second aspect of the present invention, the collision load, that is transmitted from the side frame to the upper frame at the time of a side collision of the vehicle, can be absorbed efficiently by the upper frame.

In accordance with the third aspect of the present invention, the collision load, that is inputted to the side frame at the time of a side collision of the vehicle, can be transmitted efficiently to the upper frame.

In accordance with the fourth aspect of the present invention, the degrees of freedom in the setting space for installation of an installed object can be ensured.

In accordance with the fifth aspect of the present invention, the collision load, that is transmitted from the side frame to the upper frame at the time of a side collision of the vehicle, can be absorbed efficiently by the upper frame.

In accordance with the sixth aspect of the present invention, the collision load, that is inputted to the side frame at the time of a side collision of the vehicle, can be transmitted efficiently to the upper frame.

In accordance with the seventh aspect of the present invention, the collision load, that is transmitted to the side frame at the time of a side collision of the vehicle, can be reduced, and damage to the vehicle body frame can be suppressed.

In accordance with the eighth aspect of the present invention, the collision load, that is transmitted to the side frame at the time of a side collision of the vehicle, can be reduced, and damage to the vehicle body frame can be suppressed.

DESCRIPTION OF EMBODIMENTS

Figure 3:
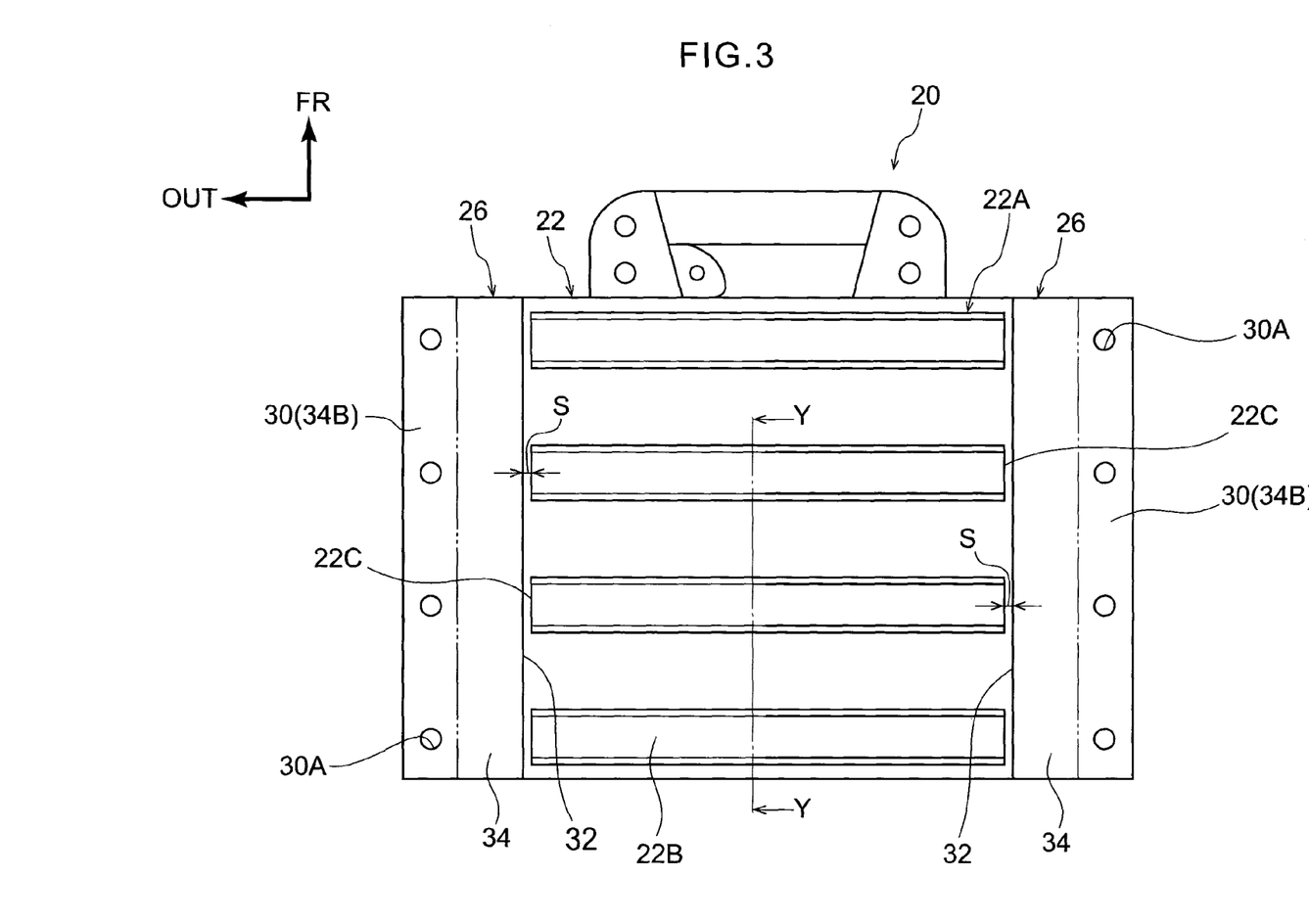
FIG. 3 is a plan view showing a battery frame relating to a first embodiment.

Embodiments relating to the present invention are described in detail hereinafter on the basis of the drawings. Note that, for convenience of explanation, arrow UP that is shown appropriately in the respective drawings indicates the vehicle body upward direction, arrow FR indicates the vehicle body frontward direction, and arrow OUT indicates the vehicle transverse direction outer side. Further, in the following description, when vertical, longitudinal, and left/right directions are used, they mean the vertical (upward/downward) of the vehicle body vertical direction, the longitudinal (front/rear) of the vehicle body longitudinal direction, and the left/right of the vehicle body left-right direction (the vehicle transverse direction), unless otherwise stated. Moreover, the respective drawings except for FIG. 3 illustrate the left side of the vehicle body, but because there is left/right symmetry and the right side of the vehicle body also is the same, description of the right side of the vehicle body will be omitted as appropriate.

First Embodiment

Figure 1:
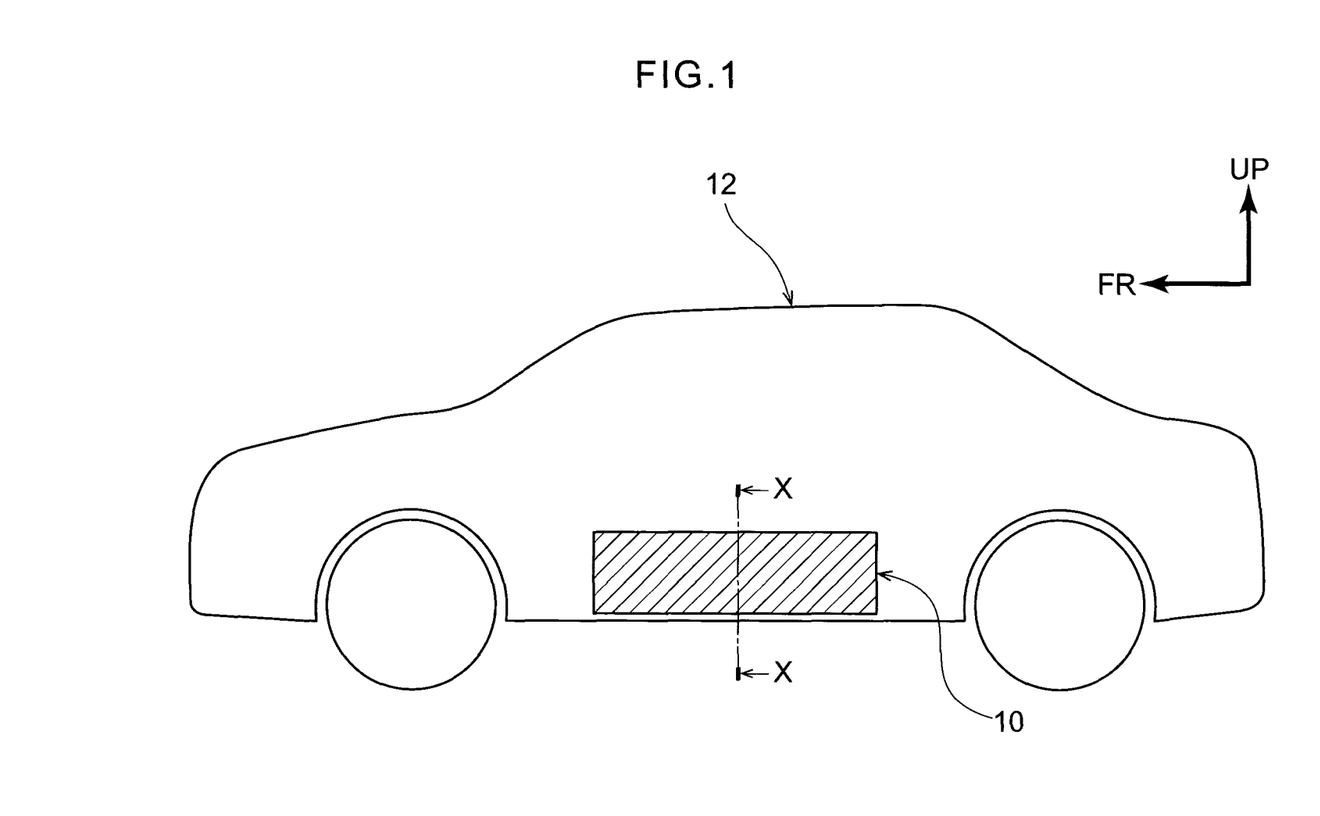
FIG. 1 is a side view showing a vehicle that is provided with a vehicle underfloor structure relating to the present embodiments.
Figure 2:
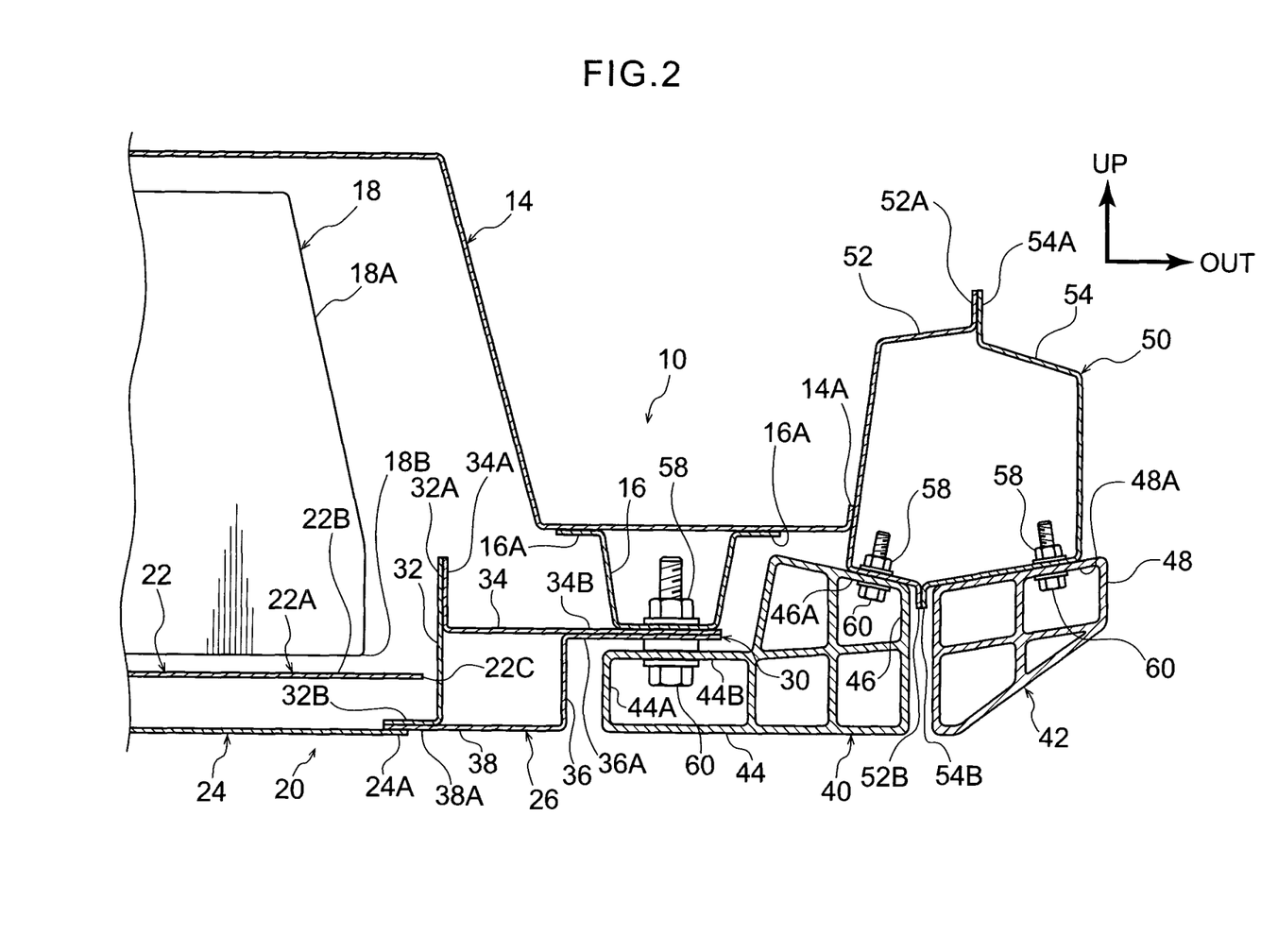
FIG. 2 is a cross-sectional view along arrow line X-X of FIG. 1 showing the left half of the vehicle.

First, a vehicle underfloor structure 10 relating to a first embodiment is described. As shown in FIG. 1 and FIG. 2, the vehicle underfloor structure 10, that is applied to a vehicle 12 such as an electric automobile or a hybrid automobile or the like, has a battery frame 20 that serves as a vehicle body frame and at which a battery 18 for driving that serves as an installed object is installed. This battery frame 20 is made of metal, and is disposed at the vehicle body lower side of a floor panel 14 that is made of metal and structures the vehicle body floor, and supports the battery 18 for driving from the vehicle body lower side.

A pair of left and right under members (under reinforcements) 16 that structure a vehicle body skeleton structure are provided along the vehicle body longitudinal direction at the lower surfaces of the vehicle transverse direction outer side both end portions of the floor panel 14. Each of the under members 16 is formed of metal and in a substantial hat shape in cross-section. Flange portions 16A, that jut-out in the vehicle transverse direction, are joined by spot welding to the lower surfaces of the vehicle transverse direction outer side both end portions of the floor panel 14.

Further, plural through-holes (not illustrated), for the insertion of bolts 60 that are described later, are formed along the vehicle body longitudinal directions (length directions) of the under members 16, in the under members 16 that extend in the vehicle body longitudinal direction. Further, weld nuts 58 are provided at the top surfaces of the under members 16, coaxially with the respective through-holes.

At the battery 18 for driving, an external package portion 18A is formed of metal (or may be formed of resin) and substantially in the shape of a rectangular box, and leg portions (not illustrated) that jut-out toward the outer side are formed integrally at plural predetermined positions of a lower side peripheral edge portion 18B of the external package portion 18A. Further, through-holes (not illustrated), for the insertion of bolts that are not shown, are formed in the respective leg portions. Note that the floor panel 14 is bendingly molded such that the vehicle transverse direction central portion side thereof is higher than the vehicle transverse direction both end portion sides thereof, in accordance with the height of the battery 18 for driving (so as to cover the battery 18 for driving from above).

As shown in FIG. 2 through FIG. 5, the battery frame 20 includes an upper frame 22 that is disposed at the vehicle body vertical direction upper side, a lower frame 24 that is disposed at the vehicle body vertical direction lower side, and side frames 26 that are described later. The upper frame 22 is bendingly molded such that plural rectangular convex portions 22A are disposed at a predetermined interval in the vehicle body longitudinal direction, when viewed in a cross-section that is seen from the vehicle transverse direction. The lower frame 24 is formed in the shape of a flat plate.

Namely, due to the regions between the respective convex portions 22A of the upper frame 22 being joined to the lower frame 24 by spot welding, plural closed cross-sectional structures, that extend in the vehicle transverse direction and are lined-up in the vehicle body longitudinal direction, are formed by the lower frame 24 and the convex portions 22A of the upper frame 22. Further, the side frames 26, that have closed cross-sectional structures and extend in the vehicle body longitudinal direction, are disposed at the vehicle transverse direction outer sides of the upper frame 22 and the lower frame 24.

Figure 4:
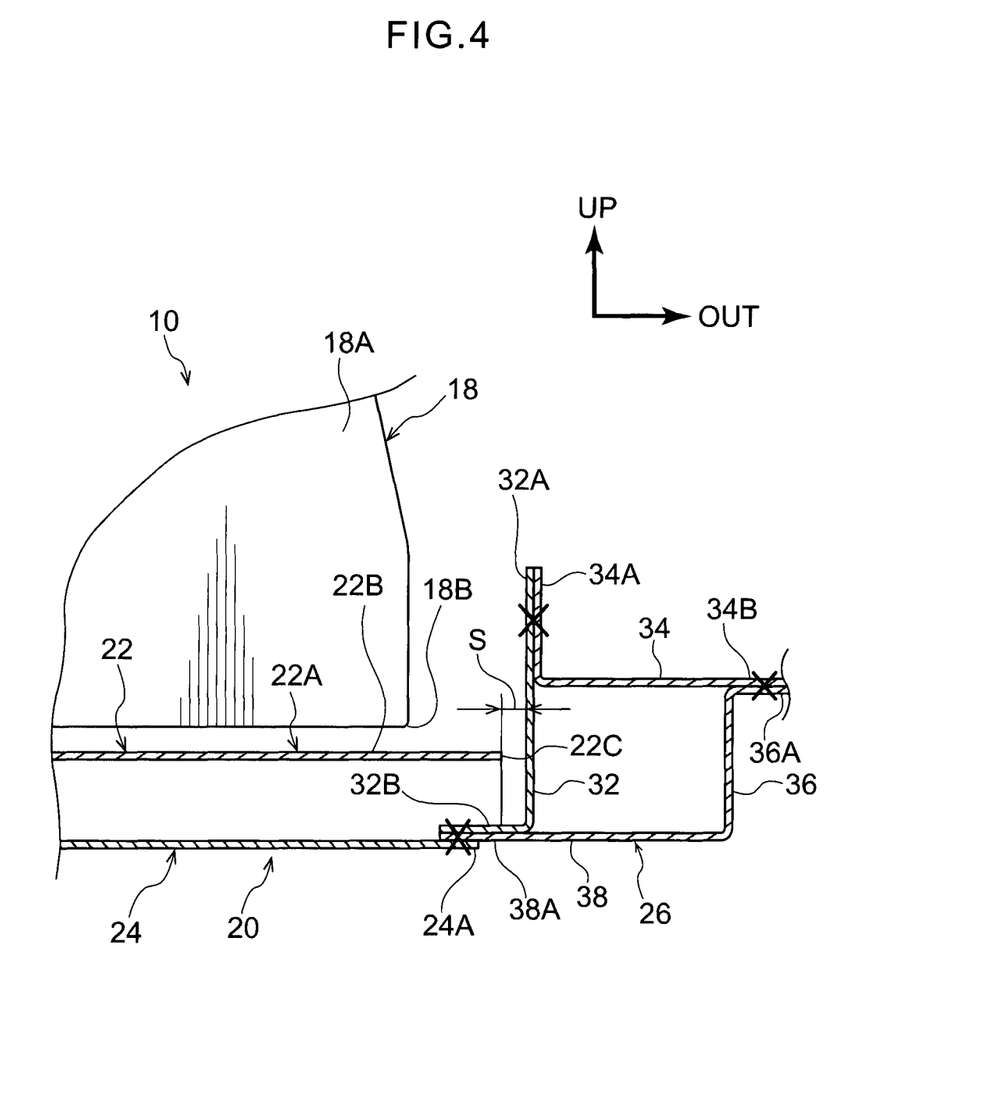
FIG. 4 is a partial, enlarged cross-sectional view showing the battery frame relating to the first embodiment.
Figure 5:
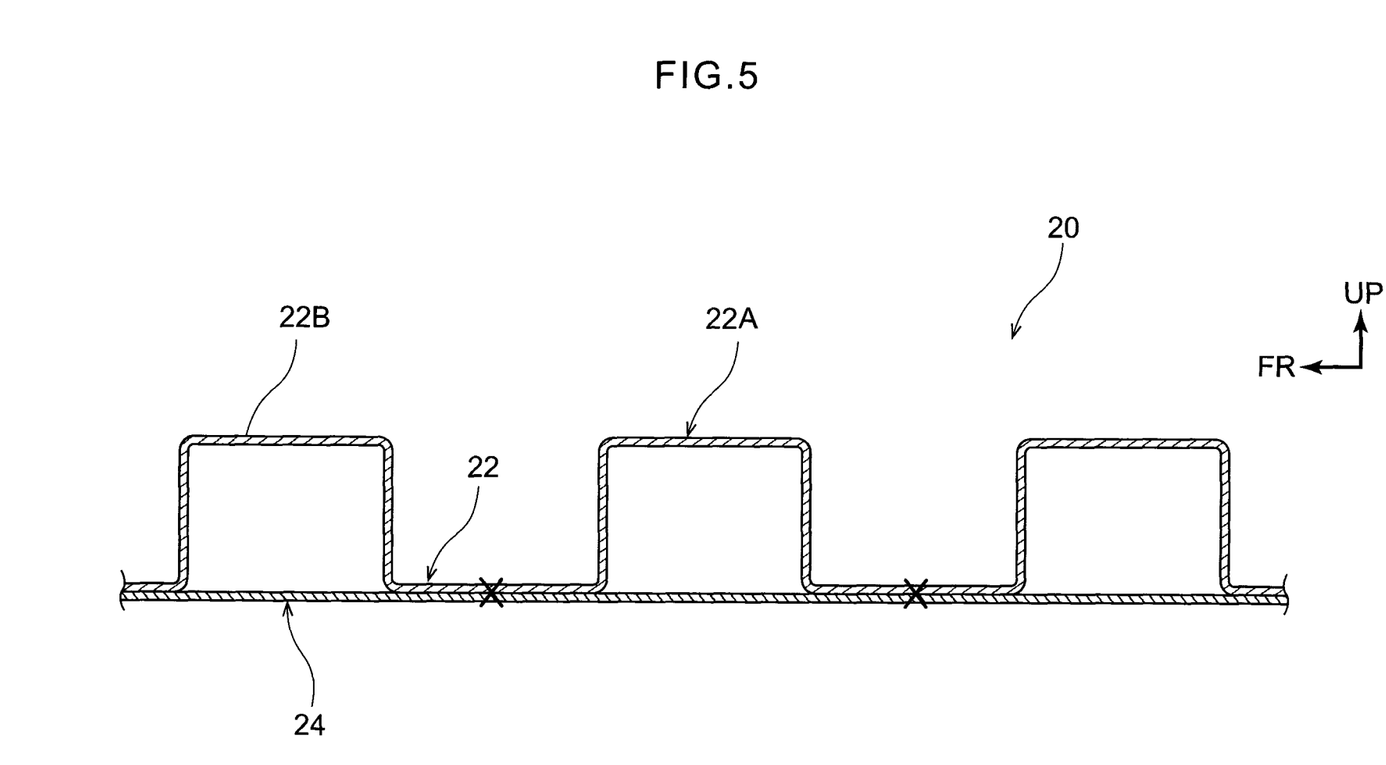
FIG. 5 is a cross-sectional view along arrow line Y-Y of FIG. 3.

In a rear view that is seen from the far sides of the drawing surfaces of FIG. 2 and FIG. 4 (from the vehicle body rear side), each of the side frames 26 is formed in a substantial "L" shape, and has a inner wall 32 that is disposed at the vehicle transverse direction inner side and an upper wall 34 that is disposed at the vehicle body vertical direction upper side. Further, in a rear view seen from the vehicle body rear side, the side frame 26 is formed integrally in a substantial "Z" shape, and has an outer wall 36 that is disposed at the vehicle transverse direction outer side, and a lower wall 38 that is disposed at the vehicle body vertical direction lower side.

Accordingly, the side frame 26 is made into a closed cross-sectional structure that is rectangular, due to an upper end portion 32A of the inner wall 32 and a bent inner end portion 34A of the upper wall 34 being joined by spot welding, and an outer end portion 34B of the upper wall 34 and a bent upper end portion 36A of the outer wall 36 being joined by spot welding, and a bent lower end portion 32B of the inner wall 32 and an inner end portion 38A of the lower wall 38 being joined by spot welding.

Further, the lower end portion 32B of the inner wall 32 and the inner end portion 38A of the lower wall 38 that are joined together are superposed on the top surface of an outer end portion 24A of the lower frame 24, and are joined together by spot welding. Due thereto, the lower wall 38 of the side frame 26 is disposed at substantially the same height position as the lower frame 24 (a position that is higher by an amount corresponding to the plate thickness of the lower frame 24).

Figure 6:
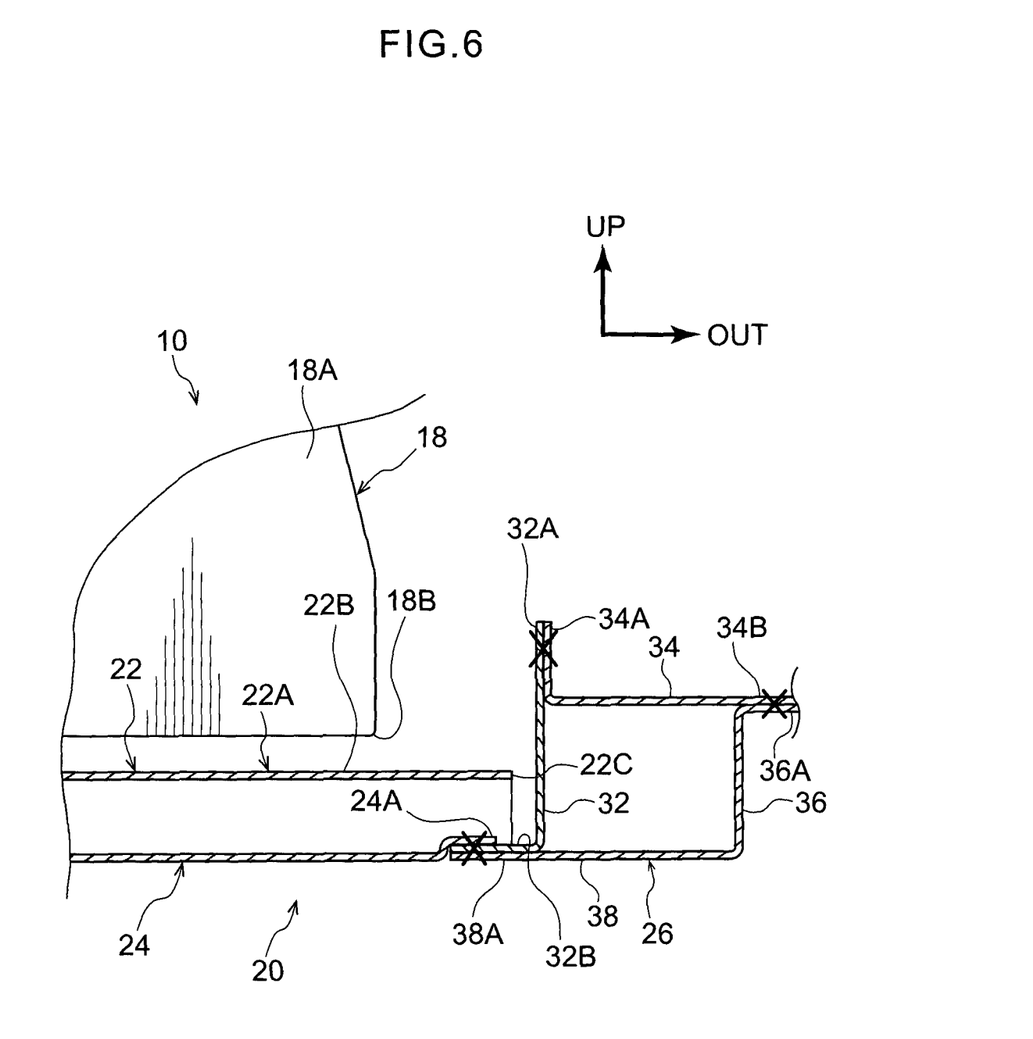
FIG. 6 is a partial, enlarged cross-sectional view showing a modified example of a lower frame relating to the first embodiment.

Note that, as shown in FIG. 6, the outer end portion 24A of the lower frame 24 may be bendingly molded so as to swell-up toward the upper side by an amount corresponding to the total of the plate thicknesses of the inner wall 32 and the lower wall 38, and the lower end portion 32B of the inner wall 32 and the inner end portion 38A of the lower wall 38 may be superposed on the bottom surface of the outer end portion 24A of the lower frame 24, and the outer end portion 24A of the lower frame 24, the lower end portion 32B of the inner wall 32 and the inner end portion 38A of the lower wall 38 may be joined together by spot welding. In this case, the lower wall 38 of the side frame 26 is disposed at the same height position as the lower frame 24.

Further, as shown in FIG. 2 and FIG. 4, the height positions of top walls 22B at the convex portions 22A of the upper frame 22 are lower than the height position of the upper wall 34 of the side frame 26. Further, as shown in FIG. 4, vehicle transverse direction outer side end portions (end surfaces) 22C of the convex portions 22A at the upper frame 22 face the inner wall 32 of the side frame 26 with a predetermined gap S therebetween.

Here, if the vehicle transverse direction outer side end portions 22C of the convex portions 22A abut the inner wall 32, there is the concern that, due to vibrations or the like during traveling of the vehicle 12, the end portions 22C will slidingly contact the inner wall 32 and abnormal sound will be generated. However, because the vehicle transverse direction outer side end portions 22C of the convex portions 22A face the inner wall 32 with the gap S therebetween, there is no worry that abnormal sound will be generated during traveling of the vehicle 12. Note that the vehicle transverse direction outer side end portions 22C of the convex portions 22A may abut the inner wall 32 provided that abnormal sound is not generated.

Figure 7:
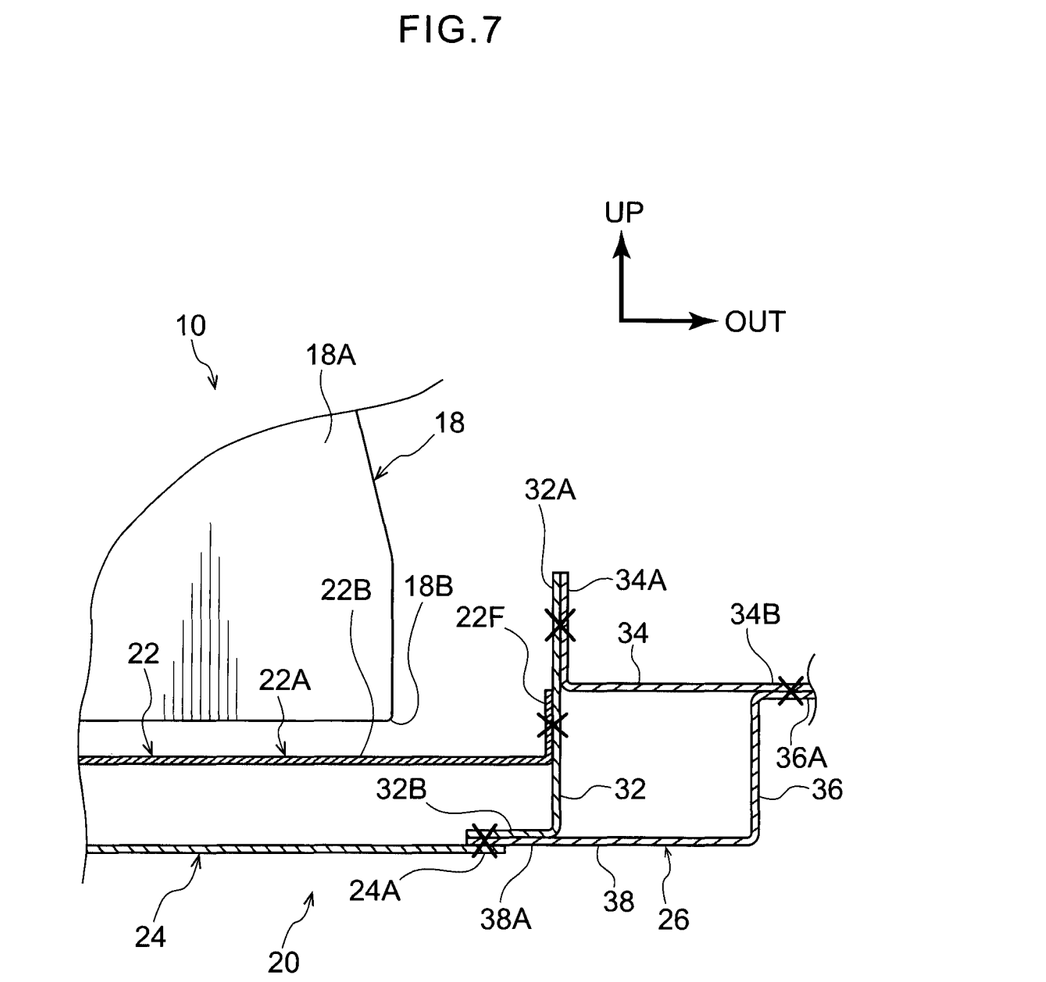
FIG. 7 is a partial, enlarged cross-sectional view showing a modified example of an upper frame relating to the first embodiment.

Further, as shown in FIG. 7, the vehicle transverse direction outer side end portions of the top walls 22B at the convex portions 22A of the upper frame 22 may be bent toward the upper side and made to be flange portions 22F, and the flange portions 22F may be joined by spot welding to the inner wall 32 of the side frame 26. In accordance therewith, generation of abnormal sound due to the vehicle transverse direction outer side end portions 22C of the convex portions 22A slidingly contacting the inner wall 32 is more reliably prevented, and further, the strength (rigidity) of the battery frame 20 including the side frame 26 is improved.

Further, as shown in FIG. 2 and FIG. 3, the outer end portion 34B at the upper wall 34 and the upper end portion 36A at the outer wall 36, that are joined together of the side frame 26, are made to be an overhang portion (flange portion) 30 that is flat-plate-shaped and juts-out toward the vehicle transverse direction outer side. Plural through-holes 30A for insertion of the bolts 60 are formed in the overhang portion 30.

This overhang portion 30 is fastened and fixed, together with an energy absorbing member 40 that is described later, by the bolts 60 and the weld nuts 58 to the under member 16. Namely, the battery frame 20 is mounted on and supported at the under member 16 by the overhang portion 30.

Further, plural through-holes (not illustrated) for the insertion of unillustrated bolts are formed in the top walls 22B of specific convex portions 22A among the plural convex portions 22A of the upper frame 22. The battery 18 for driving is fastened and fixed to the top surface of the upper frame 22 (the top walls 22B of the convex portions 22A) due to bolts being inserted-through the respective through-holes and the through-holes of the respective leg portions of the battery 18 for driving and being screwed together with nuts (not illustrated).

Further, as shown in FIG. 2, the vehicle transverse direction outer side end portion of the floor panel 14 is made to be a flange portion 14A that is bent upward. Further, the flange portion 14A is joined by spot welding to an inner panel 52 of a rocker 50 that is made of metal. Namely, the floor panel 14 spans between the left and right rockers 50.

The rocker 50 includes the inner panel 52 that is formed in a substantial hat shape in cross-section that opens toward the vehicle transverse direction outer side, and an outer panel 54 that is formed in a substantial hat shape in cross-section that opens toward the vehicle transverse direction inner side. Further, an upper flange portion 54A of the outer panel 54 is joined to an upper flange portion 52A of the inner panel 52, and a lower flange portion 54B of the outer panel 54 is joined to a lower flange portion 52B of the inner panel 52. Due thereto, the rocker 50 is made to be a closed cross-sectional structure.

Further, the energy absorbing members 40, 42, that are formed of metal or of resin and extend in the vehicle body longitudinal direction, are disposed so as to be lined-up in the vehicle transverse direction at the vehicle transverse direction outer side of the side frame 26 (the battery frame 20) and at the vehicle body lower side of the rocker 50. Each of the energy absorbing members 40, 42 is a shape in which plural (e.g., five or four) block portions having closed cross-sectional shapes are combined integrally.

An inner wall 44A of a block portion 44 at the vehicle transverse direction inner side of the energy absorbing member 40 that is disposed at the vehicle transverse direction inner side, faces the outer wall 36 of the side frame 26 with a gap therebetween (or without a gap therebetween). Further, an upper wall 44B of the block portion 44 is, together with the overhang portion 30, fastened and fixed to the under member 16 by the bolts 60 and the weld nuts 58.

An upper wall 46A of a block portion 46 that is at the vehicle transverse direction outer side upper portion of the energy absorbing member 40 is fastened and fixed by the bolts 60 and the weld nuts 58 to the inner panel 52 of the rocker 50. Further, an upper wall 48A of a block portion 48 at the vehicle transverse direction outer side upper portion of the energy absorbing member 42 that is disposed at the vehicle transverse direction outer side, is fastened and fixed by the bolts 60 and the weld nuts 58 to the outer panel 54 of the rocker 50.

At the time of a side collision of the vehicle, the energy absorbing members 40, 42 that are mounted in this way absorb a portion of the collision load by plastically deforming (being crushed) toward the vehicle transverse direction inner side. Further, a portion of the collision load that was not completely absorbed is transmitted to the floor panel 14 (the under member 16) and the battery frame 20, and is absorbed by the floor panel 14 and the battery frame 20.

Operation at the vehicle underfloor structure 10 and the battery frame 20 (the vehicle body frame) relating to the first embodiment that is as described above is described next.

As shown in FIG. 2, the top walls 22B at the convex portions 22A of the upper frame 22 are disposed at a position lower than the upper wall 34 of the side frame 26. Therefore, the battery 18 for driving can be disposed at lower position than in a case in which, for example, the top walls 22B at the convex portions 22A of the upper frame 22 are disposed at the same height position as the upper wall 34 of the side frame 26.

Accordingly, the setting space, that is provided between the floor panel 14 and the top walls 22B at the convex portions 22A of the upper frame 22 in order to install the battery 18 for driving, can be ensured to be wider (the degrees of freedom in the setting space can be ensured). Namely, even if the size or shape of the battery 18 for driving varies, the battery 18 for driving can be installed without reducing the vehicle cabin space.

Further, when the vehicle 12 is in a side collision with, for example, a pole (not illustrated) that is solid-cylindrical and extends in the vertical direction, excessive collision load is inputted locally to the rocker 50 and the energy absorbing members 40, 42. In this case, the rocker 50 and the energy absorbing members 40, 42 move while plastically deforming toward the vehicle transverse direction inner side and absorb a portion of the inputted collision load, and transmit a portion of the collision load that was not completely absorbed (that was reduced by the rocker 50 and the energy absorbing members 40, 42) to the floor panel 14 and the battery frame 20.

A portion of the collision load that was transmitted to the floor panel 14 is transmitted via the under member 16 to the overhang portion 30. Here, because the overhang portion 30 is made of metal, the overhang portion 30 can plastically deform. Accordingly, the overhang portion 30 bendingly deforms toward the vehicle body upper side from the border portion between the upper wall 34 and the outer wall 36, and absorbs a portion of the collision load, and transmits a portion of the collision load that was not completely absorbed to the side frame 26. Further, due to the energy absorbing members 40, 42 moving toward the vehicle transverse direction inner side and press-contacting the outer wall 36, a portion of the collision load is transmitted to the side frame 26.

Here, the side frame 26 of the battery frame 20 is a closed cross-sectional structure that extends in the vehicle body longitudinal direction. Further, due to the upper frame 22 of the battery frame 20 being joined to the lower frame 24, the upper frame 22 has plural closed cross-sectional structures that extend in the vehicle transverse direction. The vehicle transverse direction outer side end portions 22C at the respective convex portions 22A are respectively disposed so as to face the inner wall 32 of the side frame 26 with the gap S therebetween.

Accordingly, due to the side frame 26 moving toward the vehicle transverse direction inner side and press-contacting the respective end portions 22C of the upper frame 22, a portion of the collision load, that was reduced by the overhang portion 30 and the energy absorbing members 40, 42 and was transmitted to the side frame 26, is efficiently dispersed to and absorbed by the plural closed cross-sectional structures of the upper frame 22. Accordingly, breakage of the battery frame 20 (the upper frame 22 and the lower frame 24) can be suppressed or prevented.

Second Embodiment

The vehicle underfloor structure 10 relating to the second embodiment is described next. Note that regions that are equivalent to those of the above-described first embodiment are denoted by the same reference numerals, and detailed description thereof (also including common operation) is omitted as appropriate.

Figure 8:
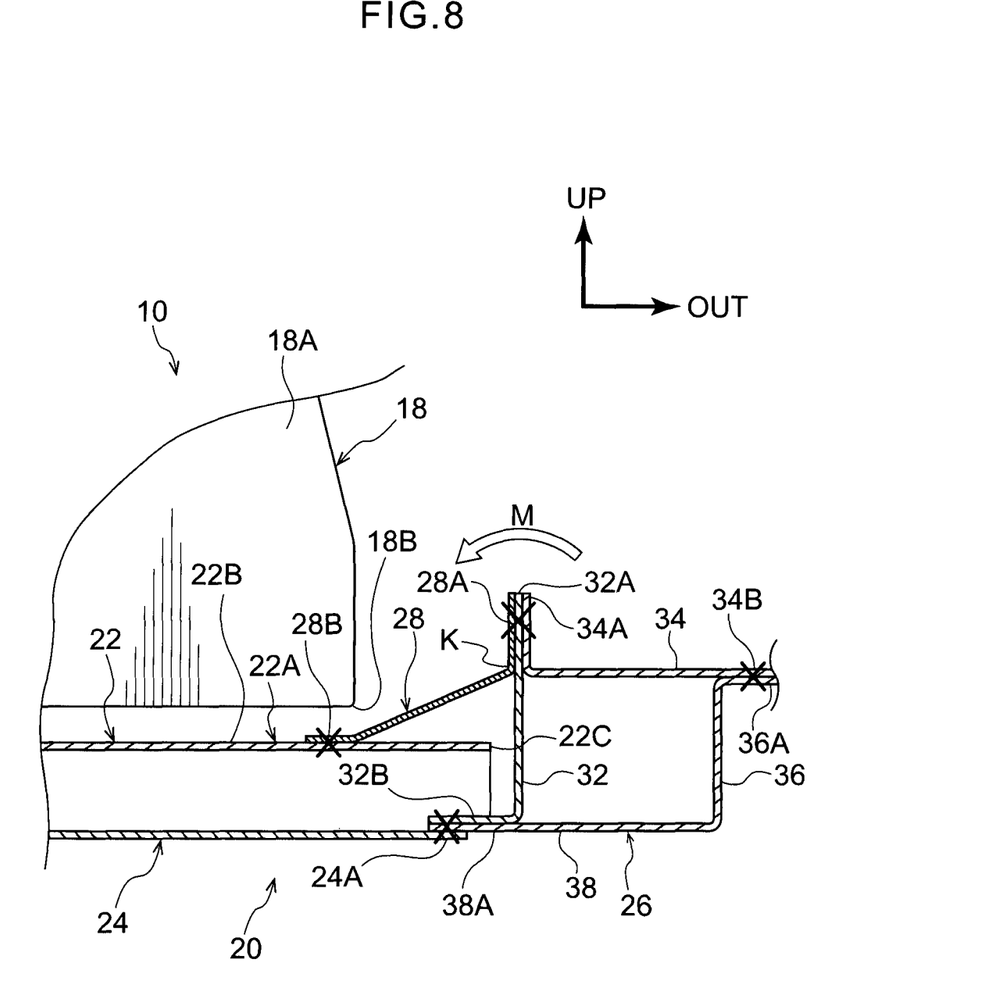
FIG. 8 is a partial, enlarged cross-sectional view showing a battery frame relating to a second embodiment.

As shown in FIG. 8, in the vehicle underfloor structure 10 relating to the second embodiment, a gusset 28, that serves as a connecting member that obliquely connects the upper end portion 32A of the inner wall 32 of the side frame 26 and the top walls 22B at the respective convex portions 22A of the upper frame 22 in a front view seen from the vehicle body longitudinal direction, is added to the above-described first embodiment.

Note that the lower end portion 32B of the inner wall 32 and the inner end portion 38A of the lower wall 38 may be superposed on and joined to the top surface of the outer end portion 24A of the lower frame 24 as shown in FIG. 8, or may be superposed on and joined to the bottom surface of the outer end portion 24A of the lower frame 24 as shown in FIG. 6.

The gusset 28 is formed in the shape of a flat plate that extends in the vehicle body longitudinal direction (the vehicle body longitudinal direction is the length direction thereof). An upper end portion 28A of the gusset 28 is bent so as to run along the wall surface of the inner wall 32. Further, the bent upper end portion 28A is, together with the inner end portion 34A of the upper wall 34, joined by spot welding to the upper end portion 32A of the inner wall 32.

Note that the height position of a bending line K at the upper end portion 28A side of the gusset 28, and the height position of the upper wall 34 at the side frame 26, are made to be substantially the same. Namely, the upper end portion 28A of the gusset 28 and the inner end portion 34A of the upper wall 34 are disposed at substantially the same vertical position with the upper end portion 32A of the inner wall 32 nipped therebetween.

On the other hand, a lower end portion 28B of the gusset 28 is bent so as to run along the wall surfaces of the top walls 22B at the respective convex portions 22A of the upper frame 22. Further, the bent lower end portion 28B is joined by spot welding to appropriate positions of the top walls 22B at the respective convex portions 22A, i.e., position that do not interfere with (do not hit) the lower side peripheral edge portion 18B of the external package portion 18A of the battery 18 for driving. Due thereto, the gusset 28 does not impede installation of the battery 18 for driving onto the upper frame 22.

Operation of the vehicle underfloor structure 10 and the battery frame 20 (vehicle body frame) relating to the second embodiment that are structured as described above is described next. Note that operation is common to that of the above-described first embodiment with respect to the point of being able to ensure the degrees of freedom of the setting space for setting the battery 18 for driving. Thus, here, explanation is given only of the operation in a case in which the vehicle 12 is in a side collision with a pole (not illustrated) that is solid-cylindrical and extends in the vertical direction.

In a case in which the vehicle 12 is in a side collision with a pole, excessive collision load is inputted locally to the rocker 50 and the energy absorbing members 40, 42. In this case, the rocker 50 and the energy absorbing members 40, 42 move while plastically deforming toward the vehicle transverse direction inner side, and absorb a portion of the inputted collision load, and transmit a portion of the collision load that was not completely absorbed to the floor panel 14 and the battery frame 20.

A portion of the collision load that was transmitted to the floor panel 14 is transmitted via the under member 16 to the overhang portion 30. Thereupon, the overhang portion 30 bendingly deforms toward the vehicle body upper side from the border portion between the upper wall 34 and the outer wall 36, and absorbs a portion of the collision load, and transmits a portion of the collision load that was not completely absorbed to the side frame 26.

Then, when a portion of the collision load is transmitted from the floor panel 14 (the under member 16) via the overhang portion 30 to the upper wall 34 of the side frame 26, a bending moment around an axis whose axial direction is the vehicle body longitudinal direction (counterclockwise as shown by arrow M in FIG. 8) is generated at the inner end portion 34A of the upper wall 34 (the upper end portion 32A of the inner wall 32).

Here, the gusset 28, that obliquely connects the top walls 22B at the respective convex portions 22A of the upper frame 22 and the upper end portion 32A of the inner wall 32 of the side frame 26, is provided between the top walls 22B and the upper end portion 32A. Further, the height position of the bending line K at the upper end portion 28A side of the gusset 28 and the height position of the upper wall 34 at the side frame 26 are made to be substantially the same.

Accordingly, the bending moment M that is generated at the inner end portion 34A of the upper wall 34 (the upper end portion 32A of the inner wall 32) can be effectively received (suppressed) by the gusset 28, and bending deformation and/or crushing deformation that arises at the upper frame 22 and the lower frame 24 can be suppressed or prevented due to offset of the centroid (the center of gravity) with respect to the side frame 26.

Further, a portion of the collision load is transmitted to the side frame 26 due to the energy absorbing members 40, 42 moving toward the vehicle transverse direction inner side and press-contacting the outer wall 36. Due to the side frame 26 moving toward the vehicle transverse direction inner side and press-contacting the respective end portions 22C of the upper frame 22, a portion of the collision load, that was reduced by the overhang portion 30 and the energy absorbing members 40, 42 and was transmitted to the side frame 26, is efficiently dispersed to and absorbed by the plural closed cross-sectional structures of the upper frame 22.

Still further, due to the gusset 28 as well, the portion of the collision load, that was reduced by the overhang portion 30 and the energy absorbing members 40, 42 and was transmitted to the side frame 26, is efficiently dispersed and transmitted to the plural convex portions 22A of the upper frame 22. Accordingly, breakage of the battery frame 20 (the upper frame 22 and the lower frame 24) can be suppressed or prevented further.

Figure 9A:
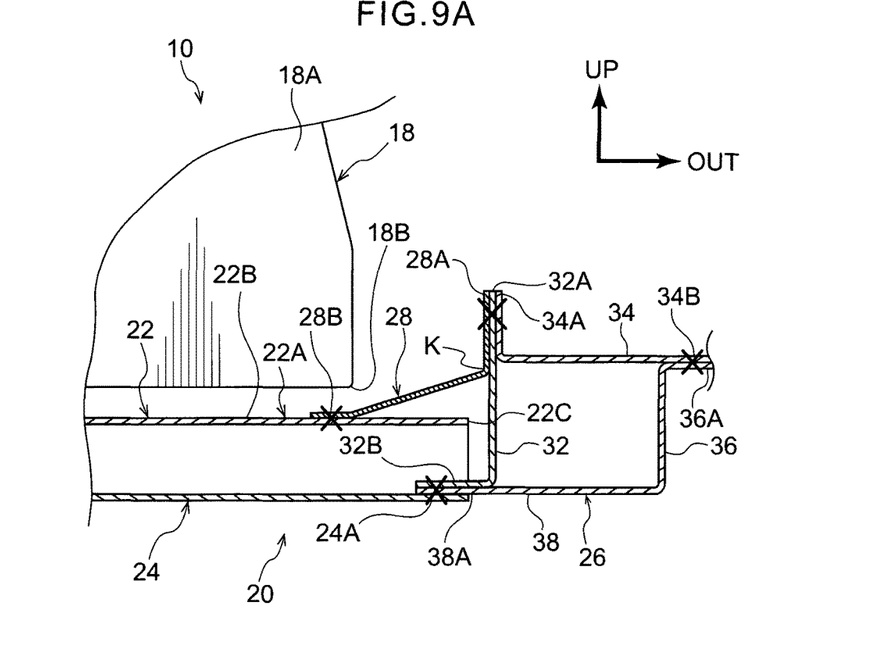
FIG. 9A is a partial, enlarged cross-sectional view showing a modified example of a joined position of a gusset relating to the second embodiment.
Figure 9B:
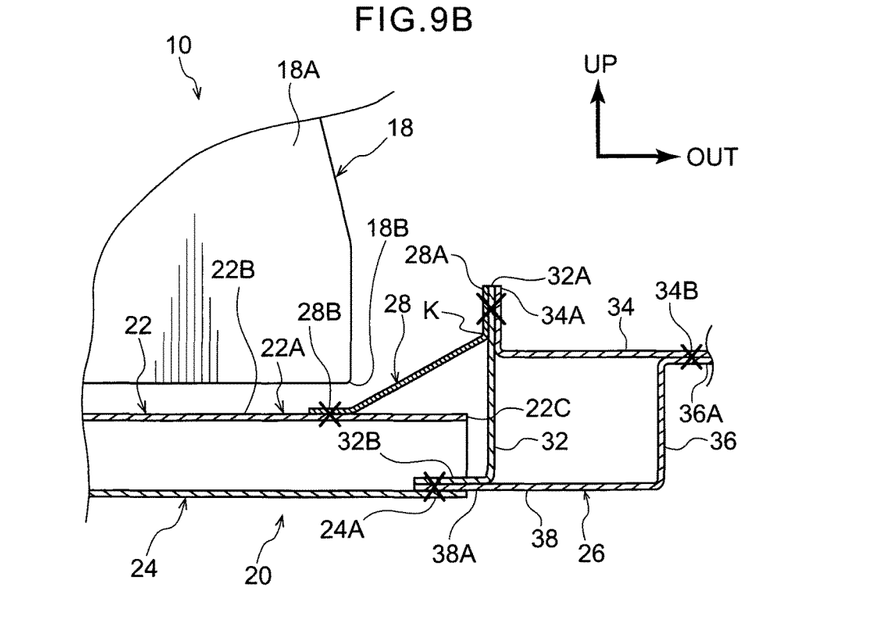
FIG. 9B is a partial, enlarged cross-sectional view showing a modified example of the joined position of the gusset relating to the second embodiment.

Note that the present embodiment is not limited to a structure in which the height position of the bending line K at the upper end portion 28A side of the gusset 28 is disposed at substantially the same position at the height position of the upper wall 34 at the side frame 26. For example, the height position of the bending line K may be disposed at a position lower than the height position of the upper wall 34 as shown in FIG. 9A, or the height position of the bending line K may be disposed at a position higher than the height position of the upper wall 34 as shown in FIG. 9B.

Modified Examples

Lastly, modified examples of the side frame 26 and modified examples of the upper frame 22 and the lower frame 24 are described. Note that regions that are equivalent to those of the above-described first embodiment and second embodiment are denoted by the same reference numerals, and detailed description thereof is omitted.

Figure 10A:
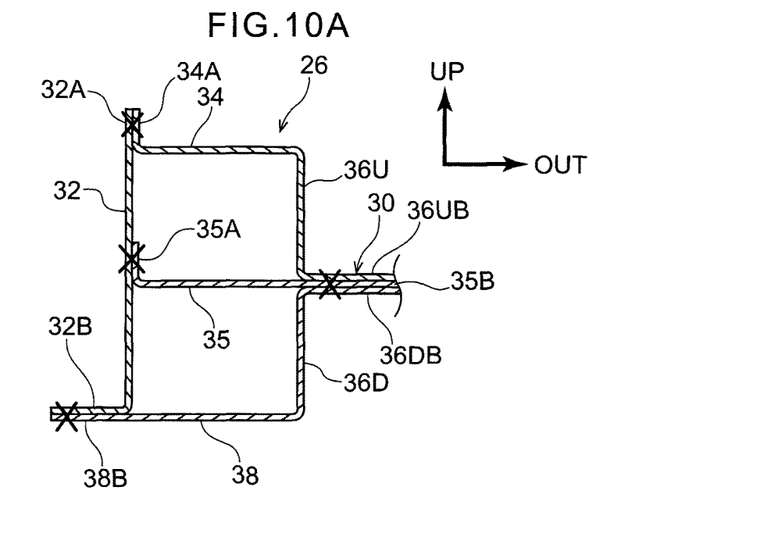
FIG. 10A is a partial, enlarged cross-sectional view showing a modified example of a side frame.

As shown in FIG. 10A for example, at the side frame 26, a middle wall 35 may be provided between the upper wall 34 and the lower wall 38 such that the outer wall 36 is divided in two vertically by the middle wall 35. In this case, it suffices for an inner end portion 35A of the middle wall 35 to be joined by spot welding to the inner wall 32, and an outer end portion 35B of the middle wall 35 to be nipped between and joined by spot welding to an outer end portion 36UB of an outer wall 36U at the upper side and an outer end portion 36DB of an outer wall 36D at the lower side. The overhang portion 30 is structured by the respective outer end portions 35B, 36UB, 36DB.

Figure 10B:
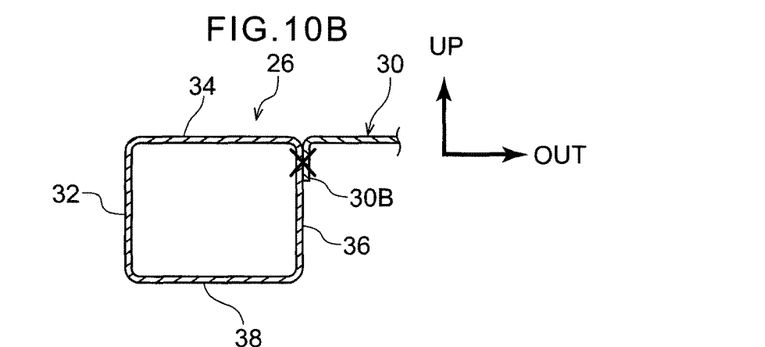
FIG. 10B is a partial, enlarged cross-sectional view showing a modified example of the side frame.

Further, as shown in FIG. 10B for example, the side frame 26 may be formed in the shape of a rectangular pipe at which the inner wall 32, the upper wall 34, the outer wall 36 and the lower wall 38 are made integral. In this case, it suffices to join an inner end portion 30B of the overhang portion 30 to the upper portion side of the outer wall 36 by spot welding. Note that a structure in which the overhang portion 30 is disposed at the same height as the upper wall 34 is preferable.

Figure 10C:
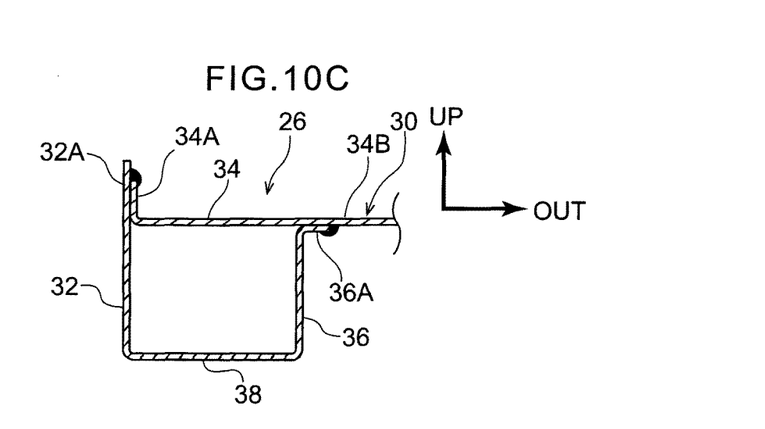
FIG. 10C is a partial, enlarged cross-sectional view showing a modified example of the side frame.

Moreover, as shown in FIG. 10C for example, at the side frame 26, the inner wall 32 and the lower wall 38 and the outer wall 36 may be made integral, and the inner end portion 34A of the upper wall 34 may be joined by arc welding to the upper end portion 32A of the inner wall 32, and the upper end portion 36A of the outer wall 36 may be joined by arc welding to the outer end portion 34B of the upper wall 34. In this case, the outer end portion 34B of the upper wall 34 becomes the overhang portion 30.

Figure 11A:
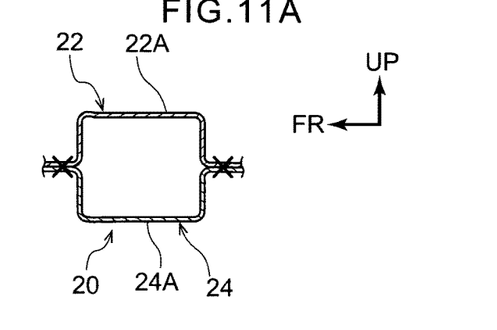
FIG. 11A is a partial, enlarged cross-sectional view showing a modified example of the upper frame and the lower frame.

As shown in FIG. 11A for example, the upper frame 22 and the lower frame 24 may be made into shapes that are vertically symmetrical and at which the plural convex portions 22A, 24A are formed respectively, and the regions between the convex portions 22A, 24A may be joined together by spot welding. Due thereto, the battery frame 20 in which plural closed cross-sectional structures are lined-up in the vehicle body longitudinal direction is structured.

Figure 11B:
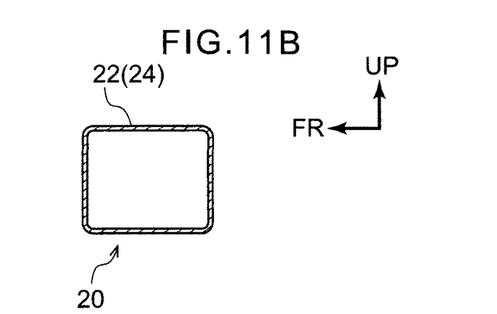
FIG. 11B is a partial, enlarged cross-sectional view showing a modified example of the upper frame and the lower frame.

Further, as shown in FIG. 11B for example, the battery frame 20 may be structured by lining-up, in the vehicle body longitudinal direction, and joining together a plurality of the upper frames 22 (or the lower frames 24) that are formed in rectangular pipe shapes.

Figure 11C:
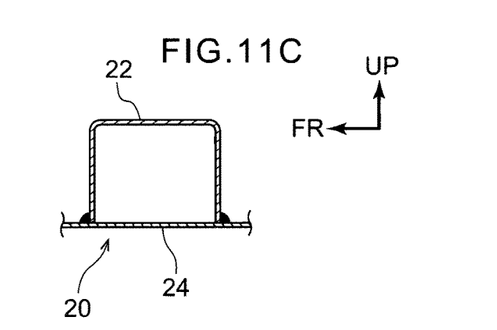
FIG. 11C is a partial, enlarged cross-sectional view showing a modified example of the upper frame and the lower frame.

Moreover, as shown in FIG. 11C for example, the battery frame 20, in which plural closed-cross sectional structures are lined-up in the vehicle body longitudinal direction, may be structured by forming the upper frame 22 in substantial "U" shapes in cross-section and joining the opening side end portion of the upper frame 22 by arc welding to the lower frame 24 that is flat-plate-shaped.

Figure 11D:
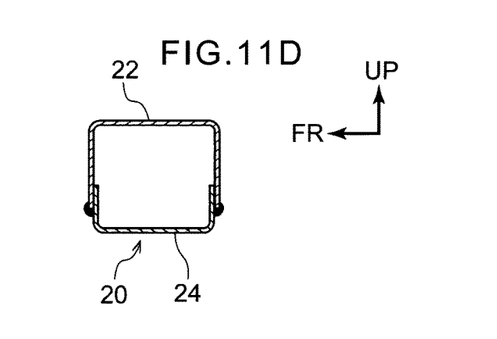
FIG. 11D is a partial, enlarged cross-sectional view showing a modified example of the upper frame and the lower frame.

Further, as shown in FIG. 11D for example, the battery frame 20 may be structured by forming the upper frame 22 and the lower frame 24 in substantial "U" shapes in cross-section respectively, and joining the opening side end portions thereof to one another by arc welding so as to form a substantially rectangular pipe shape, and lining-up a plurality of these structures, that are formed in substantially rectangular pipe shapes, in the vehicle body longitudinal direction and joining them together.

The vehicle underfloor structure 10 and the vehicle body frame (battery frame 20) relating to the present embodiments have been described above on the basis of the drawings. However, the vehicle underfloor structure 10 and the vehicle body frame (battery frame 20) relating to the present embodiments are not limited to the illustrated structures, and the designs thereof can be changed appropriately within a scope that does not depart from the gist of the present invention.

For example, the installed object is not limited to the battery 18 for driving. Namely, the vehicle body frame in the present embodiment is not limited to the battery frame 20 that supports the battery 18 for driving.

Further, the above-described respective embodiments are structured such that the respective portions are joined by spot welding, but are not limited to this. For example, there may be a structure in which joining is carried out by laser welding that joins in the form of spots by gradually reducing the welding radius by a laser (see, for example, JP-A No. 2012-115876), an adhesive that is used for structures and has high adhesive strength, rivets, or the like.

The disclosure of Japanese Patent Application No. 2013-209441, filed Oct. 4, 2013, is incorporated herein by reference in its entirety. All publications, patent applications, and technical standards mentioned in this specification are herein incorporated by reference to the same extent as if each individual publication, patent application, or technical standard was specifically and individually indicated to be incorporated by reference.

The invention claimed is:

1. A vehicle body frame comprising:
   side frames that have at least inner walls that are disposed at vehicle transverse direction inner sides and upper walls that are disposed at vehicle body vertical direction upper sides, and that are formed as closed cross-sectional structures, and that extend in a vehicle body longitudinal direction, and that are fastened and fixed to under members that are disposed at a vehicle body lower side of a floor panel; and
   an upper frame that is disposed further toward a vehicle transverse direction inner side than the inner walls and at a height that is lower than the upper walls, wherein an installed object is installed at the upper frame, and connecting members that connect the upper frame and upper portions of the inner walls, above the upper frame as seen from the vehicle body longitudinal direction, wherein:

a lower frame is disposed at a lower side of the upper frame, and the upper frame, by being joined to the lower frame, forms a closed cross-sectional structure together with the lower frame that extends in a vehicle transverse direction.

2. A vehicle underfloor structure comprising:

under members that extend in a vehicle body longitudinal direction and are disposed at a vehicle body lower side of a floor panel; and a vehicle body frame that has:

side frames that have at least inner walls that are disposed at vehicle transverse direction inner sides and upper walls that are disposed at vehicle body vertical direction upper sides, and that are formed as closed cross-sectional structures, and that extend in the vehicle body longitudinal direction, and that are fastened and fixed to the under members, an upper frame that is disposed further toward a vehicle transverse direction inner side than the inner walls and at a height that is lower than the upper walls, wherein an installed object is installed at the upper frame, and connecting members that connect the upper frames and upper portions of the inner walls, above the upper frame as seen from the vehicle body longitudinal direction, wherein:

a lower frame is disposed at a lower side of the upper frame, and the upper frame, by being joined to the lower frame, forms a closed cross-sectional structure together with the lower frame that extends in a vehicle transverse direction.

3. The vehicle underfloor structure of claim 2, wherein energy absorbing members are disposed at vehicle transverse direction outer sides of the side frames.

4. The vehicle underfloor structure of claim 2, wherein overhang portions, that jut-out from the side frames toward vehicle transverse direction outer sides, are fastened and fixed to the under members.

\* \* \* \* \*